United States Patent
Fornes et al.

(10) Patent No.: US 9,957,412 B2
(45) Date of Patent: May 1, 2018

(54) AQUEOUS CONDUCTIVE COATING

(71) Applicants: LORD Corporation, Cary, NC (US);
Timothy D. Fornes, Apex, NC (US);
Richard E. Heinze, Cary, NC (US)

(72) Inventors: Timothy D. Fornes, Apex, NC (US);
Richard E. Heinze, Cary, NC (US)

(73) Assignee: LORD Corporation, Cary, NC (US)

( * ) Notice: Subject to any disclaimer, the term of this patent is extended or adjusted under 35 U.S.C. 154(b) by 227 days.

(21) Appl. No.: 14/784,438

(22) PCT Filed: May 16, 2014

(86) PCT No.: PCT/US2014/038349
§ 371 (c)(1),
(2) Date: Oct. 14, 2015

(87) PCT Pub. No.: WO2014/186677
PCT Pub. Date: Nov. 20, 2014

(65) Prior Publication Data
US 2017/0321081 A1 Nov. 9, 2017

Related U.S. Application Data

(60) Provisional application No. 61/823,987, filed on May 16, 2013.

(51) Int. Cl.
*H01B 1/02* (2006.01)
*C09D 163/10* (2006.01)
(Continued)

(52) U.S. Cl.
CPC ............. *C09D 163/10* (2013.01); *C08K 3/08* (2013.01); *C09D 5/24* (2013.01); *C09D 7/125* (2013.01); *C08K 2003/0806* (2013.01)

(58) Field of Classification Search
CPC ........................... C08G 18/58; B01F 17/0028
(Continued)

(56) References Cited

U.S. PATENT DOCUMENTS 4,073,762 A * 2/1978 Hosoda ............... B01F 17/0028
523/403
5,804,615 A 9/1998 Schreiber et al.
(Continued)

FOREIGN PATENT DOCUMENTS

| CN | 102533061 | * | 7/2012 | ........... C09D 163/02 |
| CN | 102993903 | * | 3/2013 | ........... C09D 163/00 |

(Continued)

OTHER PUBLICATIONS

Bisphenol A Type Epoxy Resin E-51, Technical Data Sheet, https://www.okchem.com/product/bisphenol-a-type-epoxy-resin-e-51.html.*

(Continued)

*Primary Examiner* — Khanh Tuan Nguyen
(74) *Attorney, Agent, or Firm* — Todd W. Galinski

(57) ABSTRACT

An aqueous composition is provided comprising a resin, a curative, a filler, a surfactant, and water; wherein the resin comprises an average molecular weight of less than about 800 Daltons and comprises at least 50 weight percent of at least one of: (a) an unmodified epoxy or phenoxy resin, or (b) a surfactant-modified epoxy or phenoxy resin. This composition, applied to a substrate and dried, can then be cured so as to thermoset the resin and self-assemble to form continuous pathways of filler within the resin matrix.

17 Claims, 3 Drawing Sheets

(51) Int. Cl.
*C09D 5/24* (2006.01)
*C09D 7/12* (2006.01)
*C08K 3/08* (2006.01)

(58) Field of Classification Search
USPC .......................................... 252/73; 523/403
See application file for complete search history.

(56) References Cited

U.S. PATENT DOCUMENTS

| | | |
|---|---|---|
| 2004/0028859 A1 | 2/2004 | LeGrande et al. |
| 2005/0237473 A1 | 10/2005 | Stephenson et al. |
| 2007/0246245 A1 | 10/2007 | Ahn et al. |
| 2008/0138597 A1 | 6/2008 | Asai |
| 2008/0246007 A1 | 10/2008 | Gellrich |
| 2008/0251757 A1* | 10/2008 | Yamamoto ............. C08G 18/58 252/73 |
| 2009/0004487 A1 | 1/2009 | Katsuta et al. |
| 2009/0014691 A1 | 1/2009 | Kint et al. |
| 2009/0072199 A1 | 3/2009 | Lewarchik et al. |
| 2010/0021742 A1 | 1/2010 | Kataoka et al. |
| 2010/0314105 A1 | 12/2010 | Fornes |
| 2011/0039064 A1 | 2/2011 | Wani et al. |
| 2011/0135936 A1 | 6/2011 | Katsuta et al. |
| 2011/0155812 A1 | 6/2011 | Rouse et al. |
| 2011/0248223 A1 | 10/2011 | Zheng |
| 2012/0097903 A1 | 4/2012 | Scheffer |
| 2012/0153239 A1 | 6/2012 | Chandrasekhar et al. |
| 2012/0305862 A1 | 12/2012 | Kasahara et al. |

FOREIGN PATENT DOCUMENTS

| | | |
|---|---|---|
| WO | 30/73371 | 12/2000 |
| WO | 2013/041712 | 3/2013 |
| WO | 2013/090344 | 6/2013 |
| WO | 2013/149234 | 10/2013 |

OTHER PUBLICATIONS

Database WPI Week 201402 Thomson Scientific, London, GB; AN 2013-K76481 XP002726728, CN102993903A (Tianchang Kailin Chem Co Ltd) Mar. 27, 2013 abstract.

Database WPI Week 201278 Thomson Scientific, London, GB; AN 2012-L42282 XP002726729, CN102533061A (Luoyang Qiwei Anti Corrosion Eng Materia) Jul. 4, 2012 abstract.

* cited by examiner

AQUEOUS CONDUCTIVE COATING

CROSS REFERENCE TO RELATED APPLICATIONS

The present application claims priority under 35 U.S.C. § 119(e) from U.S. Provisional Patent Application Ser. No. 61/823,987 filed May 16, 2013, entitled "Aqueous Conductive Coating", the disclosure of which is incorporated herein by reference.

FIELD OF THE INVENTION

This invention relates to an aqueous curable composition having high conductivity, and to a cured thermoset coating formed therefrom.

BACKGROUND OF THE INVENTION

As volatile organic compounds (VOCs) become more strictly regulated in their usage, there is an ever-growing need for water-based coatings and adhesives. In particular, there is a need for water-based thremosetable (curable) coatings that are highly conductive. Representative uses include electrostatic dissipation coatings, lightning strike protectant coatings, and electrically conductive adhesive and coatings for use in the fabrication of electronic components. Prior art aqueous conductive coatings suffer from the difficulty of suspending large quantities of conductive filler in an aqueous medium, as well as dispersing a resin capable of drying and curing to form a robust coating. As a result, many of the prior art coatings are either not as conductive as certain applications demand, or are expensive and poorly cohesive due to extraordinarily high filler loading.

It is to these perceived needs that the present invention is directed.

SUMMARY OF THE INVENTION

Building an aqueous reactive composition based upon epoxy resins and conductive fillers is not straightforward. Special care must be taken to balance the competing polar and non-polar forces needed to disperse, dissolve, and/or suspend the individual ingredients in the water solution. This requires selecting the appropriate type(s) and amount(s) of surfactant capable of dealing with materials of high, medium, and low polarity and in some cases dispersing the individual ingredients in a specific order. For example, surfactants used to disperse and suspend filler particles are not necessarily capable of doing the same with common epoxy resins or curatives. Moreover, the geometry of the filler, e.g. the shape and surface area, may dictate the added surfactant loading which may or may not pose problems with dispersing the other ingredients. Too much surfactant is well-know to affect final coating performance. Incorrect addition of ingredients, including surfactants, and the extent of mixing (shear level and time) can lead to poor aqueous mixtures. As will be discussed, blends of two or more surfactants may be necessary to delivery stable aqueous coating that when cured gives satisfactory properties.

In a first embodiment of the present invention, an aqueous composition is provided comprising a resin, a curative, a filler, a surfactant, and water; wherein the resin comprises an average molecular weight of less than about 800 Daltons and comprises at least 50 weight percent of at least one of: (a) an unmodified epoxy or phenoxy resin, or (b) a surfactant-modified epoxy or phenoxy resin. Preferably, the resin comprises at least 85 weight percent of an unmodified epoxy resin, and a degree of polymerization of less than 1 repeat unit. Most preferably, the resin comprises at least one of diglycidyl ether of bisphenol F, diglycidyl ether of bisphenol A, or epoxy novolac. An in a further embodiment of the invention, the composition is free of isocyanates and acrylates, and the resin comprises no reactive groups other than epoxide or hydroxyl.

In another embodiment of the invention, the curative comprises a latent amine adduct, preferably a polyamine anhydride adduct based on the reaction between phthalic anhydride and triethylenetetraamine or the reaction between tetraethylendiamine, dimethyldipropylenetriamine, and a dibasic ester. In yet another embodiment of the invention, the curative is present in an amount comprising 15 to 40 weight percent based on the weight of the resin and the curative combined.

In one embodiment of the invention, the surfactant is present relative to the filler in a weight ratio of 1.0:20 to 1.0:100. In another embodiment of the invention, the surfactant modified epoxy resin comprises at least one of a Bis-A or Bis-F type epoxy resin modified with an ethylene oxide/propylene oxide polyether monoamine. In a preferred embodiment of the invention, the surfactant comprises a single tail surfactant. In one preferred embodiment of the present invention, the surfactant comprises at least one of polyethylene glycol dodecyl ether or polyoxyethylene (4) lauryl ether. In another preferred embodiment of the present invention, the surfactant comprises at least one of poly(ethylene glycol)-block-poly(propylene glycol)-block-poly(ethylene glycol), or poly(propylene glycol)-block-poly(ethylene glycol)-block-poly(propylene glycol).

In a further embodiment of the invention, the filler comprises at least one of a silver flake and a silver powder. In another preferred embodiment of the present invention, the filler comprises a non-polar coating on a surface thereof. In yet another preferred embodiment of the present invention, the coating comprises stearic acid. In a still further embodiment of the present invention, the conductivity of the dried, cured composition is at least 10 s/cm for a filler content of 2 percent based on the total volume of the composition.

In another aspect of the invention, a method for coating a substrate is provided comprising the steps of: a) Mixing together a resin, a curative, a filler, a surfactant, and water; wherein the resin comprises an average molecular weight of less than about 800 Daltons and comprises at least 50 weight percent of at least one of: (a) an unmodified epoxy or phenoxy resin, or (b) a surfactant-modified epoxy or phenoxy resin, to provide a homogenously mixed coating composition, b) applying the coating composition to a substrate, c) drying the composition to remove substantially all the water, and d) curing the coating composition. In one embodiment of the invention, during step a) the filler is first dispersed in the water with surfactant, then the resin is dispersed into the filler containing water. In another embodiment of the invention, during step c) the composition remains homogenously mixed, and during step d) the composition becomes heterogeneously mixed as the filler and resin self-assemble to form connected pathways of filler through the resin.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

So that the manner in which the above-recited features, advantages and objects of the invention, as well as others which will become more apparent, are obtained and can be understood in detail, a more particular description of the invention briefly summarized above may be had by reference to the embodiment thereof which is illustrated in the appended drawings, which drawings form a part of the specification and wherein like characters of reference designate like parts throughout the several views. It is to be noted, however, that the appended drawings illustrate only preferred and alternative embodiments of the invention and are, therefore, not to be considered limiting of its scope, as the invention may admit to additional equally effective embodiments.

DETAILED DESCRIPTION OF THE PREFERRED EMBODIMENTS

Figure 1:
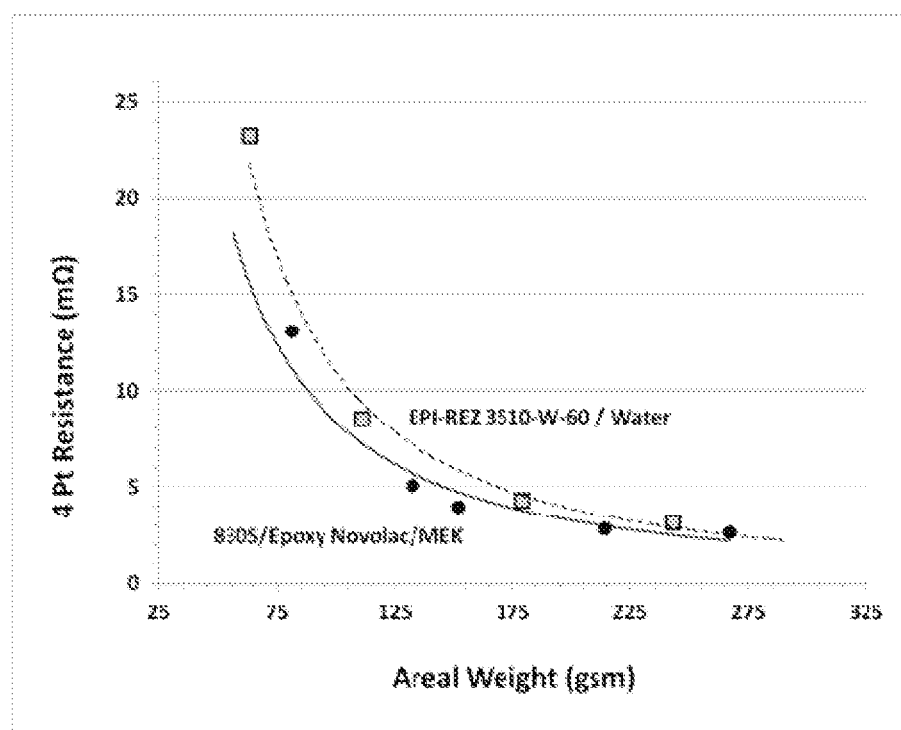
FIG. 1. Is a plot of the effect of areal weight on the 4-Point electrical resistance of latent amine based films cast from MEK and water in an embodiment of the invention.

In a first aspect of the present invention, a composition is provided a resin, a curative, coated filler, a surfactant, and water; wherein the resin has a molecular weight of less than about 800 Daltons and comprises at least 50 weight percent of at least one of an unmodified epoxy resin or surfactant-modified epoxy resin. This composition, applied to a substrate and dried, can then be cured so as to thermoset the resin and self-assemble to form continuous pathways of filler within the resin matrix.

In a first embodiment of the present invention, the resin comprises an unmodified epoxy or phenoxy resin. For the purposes of the present invention, "unmodified" is defined as having no reactive groups other than epoxide or hydroxyl groups on the molecule. Preferred resins include a diglycidal ether of a bisphenol compound, preferably bisphenol A or F, and epoxy novolac resins. In one embodiment of the present invention, the epoxy resin comprises an average degree of polymerization of less than two repeat units, and preferably less than one repeat unit. In a further embodiment of the invention, the epoxy resin exists in liquid form at room temperature (77° F.) and comprises a relatively low molecular weight, typically less than about 1000 Daltons, preferably less than about 800 Daltons, and most preferably less than about 600 Daltons. The resin is generally present in an amount from about 60 to about 98 volume percent, typically about 13 to about 96 weight percent based on the total dry weight of the composition.

In another embodiment of the present invention, the resin component is substantially free of isocyanates or acrylates. In an additional embodiment of the present invention, the resin is completely free of isocyanates or acrylates.

In an embodiment of the present invention, the aqueous coating composition is cured through an addition cure mechanism. Free radical cure mechanism are to be avoided as air inhibition of the cure will lead to a partially uncured surface. In one embodiment of the present invention, a free radical cure may be employed along with a second cure mechanism to provide more complete cure of the material at its surface.

In a preferred embodiment of the invention, preferred curatives include polyamides, such as a polyamine anhydride adduct based on the reaction product of pthalic anhydride and diethylenetriamine. Other suitable amides may be capable curing at lower temperature include the reaction product of acids, anhydrides, and esters with multifunctional amines. Some imidazoline may be formed in the reaction. Suitable di-acids or dimethyl esters include succinic, glutaric, adipic, valeric, azelaic acid. A suitable monoacid is tall oil fatty acid (TOFA). Suitable monoesters include methyl butyrate, methyl propionate, methyl valerate methyl hexanoate, methyl octanoate, methyl benzoate. Suitable multifunctional amines include diethylenetriamine, triethylene tetraamine, tetraethylene pentaamine, pentaethylenehexamine and mixtures with aminoethylethanolamine, dimethyldipropylentriamine, and N-Methyl-1,3-diaminopropane.

The curative is generally present in an amount from about 15 to about 40 weight percent based on the weight of the resin and curative combined.

In another embodiment of the present invention, the composition comprises a filler. Available fillers include pure metals such as aluminum, iron, cobalt, nickel, copper, zinc, palladium, silver, cadmium, indium, tin, antimony, platinum, gold, titanium, lead, and tungsten, metal oxides and ceramics such as aluminum oxide, aluminum nitride, silicon nitride, boron nitride, silicon carbide, zinc oxide. Carbon containing fillers could consist of graphite, carbon black, carbon nanotubes, and carbon fibers. Suitable fillers additionally comprise alloys and combinations of the aforementioned fillers. Additional fillers include inorganic oxide powders such as fused silica powder, alumina and titanium oxides, and nitrates of aluminum, titanium, silicon, and tungsten. The particulate materials include versions having particle dimensions in the range of a few nanometers to tens of microns. In a more preferred embodiment of the present invention, the filer comprises one that is electrically conductive, thermally conductive, or both. In a most preferred embodiment of the present invention, the filler comprises a metal flake which has been coated with a non-polar coating to facilitate filler migration into conductive pathways during cure of the composition, as described below.

In a preferred embodiment of the present invention, the filler is coated with a non-polar fatty acid selected from stearic, oleic, linoleic and palmitic acids. In one embodiment of the present invention, the total filler concentration is less than about 40 volume percent, and preferably less than about 30 volume percent, and most preferably less than 20 volume percent, based on the dry volume of the composition. In another embodiment of the present invention, the total filler concentration is less than 10, preferably less than 5, and most preferably about 2 volume percent based on the dry volume of the composition.

In an embodiment of the present invention, a surfactant is employed to disperse both the resin and the coated filler particles in water. In a preferred embodiment of the present invention, the surfactant comprises a non-ionic surfactant. In another embodiment of the invention, the surfactant comprises a single tail surfactant. In one embodiment of the present invention, a single surfactant is employed to disperse both resin and filler, and in an alternate embodiment of the invention separate surfactants are employed to disperse the resin and filler. This allows surfactant selection to be tailored to the particular aspects of the resin/filler.

The hydrophilic-lipophilic balance (HLB) value appears to be critical for dispersing epoxy resins, with larger values being preferred, whereas HLB-value appears less critical for dispersing the filler particles. However, there is a tradeoff wherein as HLB value increases, conductivity of the cured composition decreases.

Regarding a surfactant for the filler, the "required HLB" of an ingredient for the fatty acids and alcohols typically used as coatings on the fillers is recommended to be in the range of 10-12. ("The HLB System" brochure, Page 9 (Table 4), ©2012 Croda Inc.) However, this HLB was found to be less critical than that for the epoxies and the systems were found to be more robust with respect to HLB value required. The HLB level of the surfactant also appears to be less important than the chemistry of the filler coating, the surface area of the flake, and the amount of filler coating employed.

In an embodiment of the present invention comprising aromatic epoxies such as those based on Bis-A or Bis-F, preferred surfactants include non-ionic surfactants or blends of surfactants comprising an HLB value of about 16 to about 18, although the chemical structure and level used can also be of importance. Suitable surfactants comprise ethoxylates of oleic, stearic, lauric, palmitic acids or alcohols, such as polyethylene glycol dodecyl ether or polyoxyethylene (4) lauryl ether. In an additional embodiment of the invention, block copolymer surfactants such as poly(ethylene glycol)-block-poly(propylene glycol)-block-poly(ethylene glycol), or poly(propylene glycol)-block-poly(ethylene glycol)-block-poly(propylene glycol) are employed.

In a further embodiment of the invention, the resin and surfactant are combined to provide a surfactant modified epoxy resin. In this manner the unmodified epoxy resin is reacted to provide a surfactant functionality so as to be self-emulsifying. Such, self emulsifying epoxy resins comprise epoxy resins with a surfactant chemically tied into the molecule so there is less likelihood of it being extracted as might be the case with external surfactants used to disperse the epoxy resin into water. A preferred surfactant modified epoxy resin comprises the reaction product of a Bis-F epoxy with 5% Surfonamine® L100 (a ethylene oxide/propylene oxide (EO/PO) polyether monoamine of about 1000 molecular weight, available from Huntsman), giving an HLB value of 17.

For filler dispersal, where the filler is coated with a non-polar fatty acid coated filler, a surfactant is employed comprising a lipophilic portion to interact with the long hydrocarbon chain of the non-polar fatty acid coating on the filler, and a hydrophilic portion to allow the flake to be dispersed in the highly polar water.

In a further embodiment of the present invention, the order in which the epoxy and filler are dispersed is critical. Some of the external surfactant based systems contained a blend of surfactants which contained a low enough HLB value so that the silver could be directly dispersed in the epoxy. However, adding the low HLB surfactant to the epoxy-silver mixture does not lead to a very stable dispersion, resulting in grainy surface and low conductivity. In a preferred embodiment of the present invention, the composition is assembled by first dispersing the coated filler into water with a minimum amount of surfactant, and then adding the epoxy emulsion and curing agent.

In one embodiment of the present invention, the aqueous composition comprises an epoxy resin filled with a coated conductive filler, and curative, the combination being capable of self-assembling to form conductive pathways during a cure process. The conductive filler self-assembles into conductive pathways during cure of the polymer matrix to provide a conductive material having a lower electrical resistance than a similarly filled system that forms a homogeneous structure on curing.

While not fully understood and not wishing to be bound by this theory, it is believed that the self-assembly and domain formation and sintering are sensitive to the epoxy resin's cure temperature, the cure time, and the level of pressure applied during the cure. In other words, domain formation and sintering are thermodynamically driven processes. In a still a further embodiment, the temperature profile at which the sample is heated will affect the extent of domain formation and sintering. In total, the processing conditions can be tailored to achieve a conductive adhesive having the best combination of properties at minimal filler loading, which often translates to lower cost and provides an opportunity to take advantage other properties that are adversely affected by high filler loadings. In some cases, when the material is employed in an application that is not able to withstand high sintering temperatures, higher pressures or non-traditional sintering techniques may used to achieve exceptionally low-resistance.

The filler component and epoxy resin/curative compounds are chosen along with proper surfactants so as to create a homogeneous mixture when mixed in an aqueous state. This material is then applied to a substrate and dried. During a subsequent cure process, it is believed that the resulting polymer formed from the epoxy compound then has a repulsive interaction with the filler so as to allow the composition to self-assemble into a heterogeneous compound having filler-rich domains wherein the filler composition is significantly higher than the bulk filler concentration. Thus, while the overall (bulk) filler concentration of the compound does not change, the filler particles and the resin component self-assemble in situ into respective regions of high concentration. This phenomenon can lead to a self-assembled network of interconnected filler particles formed in situ from a mixture having very few, if any, initial filler-filler contacts.

The domains formed upon curing of the resin in the presence of the filler results in filler-rich domains having a higher than bulk (average) filler concentrations and in resin rich domains having lower than bulk (average) filler concentrations. The areas of higher than average filler concentration can form semi-continuous or continuous pathways of conductive filler material extending throughout the body of the cured composition. These pathways provide a low resistance route through which electrons and/or thermal phonons can travel. In other words, the pathways or channels allow for greatly enhanced thermal or electrical conductivity. This conductive pathway may be further enhanced by sintering the filler particles together. Such highly conductive pathways are particularly beneficial for applications such as lightning strike protection given the large amount of electrical current and heat that must be dissipated during a strike event.

Sintering, as it is understood in the art, is a surface melting phenomenon in which particles are fused together at temperatures below the material's bulk melting temperature. This behavior is brought about by a tendency of the material to relax into a lower energy state. As such, selection of filler type, size, and shape can greatly affect the sinterability of the filler particles. Certain particles, such as thin, wide, flat, plates are often formed by shearing large particles via various milling processes. This process imparts a large amount of internal stress in addition to creating a large amount of surface area. When a certain amount of heat is added to the particles, they will have the tendency melt and fuse together thereby relieving the internal strain and decreasing the overall surface energy of the particles. For this reason, the preferred filler particles for use in the present invention are those that comprise some degree of thermal or electrical conductivity and sinter easily. In a still further embodiment of the present invention, the preferred filler comprises a metallic particle that has been subjected to cold working which has imparted strain into the structure of the filler which further enables sintering.

The sintering temperature will vary according to the material chosen as the filler, as well as the geometry of the filler particle. However, in a preferred embodiment of the present invention, it is advantageous to balance the cure of the resin and the sintering of the filler such that they occur simultaneously. In this embodiment, the cure temperature and profile is selected to coincide with the sintering temperature of the filler, so as the curing resin becomes repulsive to the filler and the filler particles are forced together, the individual filler particles can sinter once particle to particle contact is made. This is believed to be responsible for the continuous filler structure seen throughout the fully cured composition. In a preferred embodiment of the present invention, the sintering temperature is at least about 50° C., more preferably about 100° C., and even more preferably above 100° C. for silver flake filler.

Although the present invention has been described with reference to particular embodiments, it should be recognized that these embodiments are merely illustrative of the principles of the present invention. Those of ordinary skill in the art will appreciate that the compositions, apparatus and methods of the present invention may be constructed and implemented in other ways and embodiments. Accordingly, the description herein should not be read as limiting the present invention, as other embodiments also fall within the scope of the present invention as defined by the appended claims.

EXAMPLES

Example 1

Using "off-the-shelf" epoxy dispersions, although optimized for stability in water, are not necessarily ideal for creating conductive films with good flexibility among other properties. For example, EPI-REZ 35-10-W60, a dispersion of DGEBA (EEW=187 g/mole) in water, produced a very brittle film after curing. Most other commercial dispersions that might offer flexibility are made with much higher MW resins and would not be expected to show the phase separation of the current preferred solvent based system. Additionally, the HLB value of the epoxy is critical to obtaining a stable emulsion and requires high levels of surfactant.

In a first attempt, dispersions obtained using Epiclon® 830S (a DGEBF resin available from DIC Corporation) with a surfactant package including blends of SPAN 80, a nonionic surfactant, and TWEEN 80, an ethoxylated oleic acid, both available from Croda international, having an HLB of 10-16 resulted in settling of the epoxy and a notable clear layer forming in the vessel. Even worse were the dispersions of a blend of Epiclon 830S and an epoxy novolac resin with the same surfactant package, with some of the epoxy novolac resin separating and settling to the bottom.

In contrast, three excellent dispersions yielding stable emulsions were prepared, the first employed Synperonic® PE/F108 (a high molecular weight, nonionic, ethylene oxide/propylene oxide block copolymer available from Croda International Plc.) with Maxemul® 7101 (a high molecular weight non-ionic polymeric surfactant from Croda). The second employed Surfonamine® L207 (a relatively hydrophilic polyether monoamine of approximately 2,000 molecular weight available from Huntsman Corporation.). A third contained Surfonamine L100 (a relatively more hydrophobic EO/PO polyether monoamine of about 1000 molecular weight, available from Huntsman). In the case of the third dispersion, about half as much surfactant was required to produce a stable emulsion.

Example 2

In an embodiment of the present invention wherein the filler comprises a non-polar fatty acid coated silver flake, dispersing the silver into water is more tolerant of HLB value but the order of dispersion and type of silver flake and coating used on the silver are critical and require a delicate balance. The wrong choice leads to agglomerated particles or rapidly settling of the filler, resulting in very poor quality films and poor conductivity.

A study was performed to determine the effect of adding surfactant, namely Triton X-100 (polyethylene glycol p-(1, 1,3,3-tetramethylbutyl)-phenyl ether from Dow Chemical Company), on the appearance of mixtures of 37 weight percent Silver Flake A (oleic acid coated, weight loss=1 g/100 g Ag at 538° C., particle size (D50)=~10 microns [determined by Malvern light scattering]) and 63 weight percent water.

The effect of addition of Triton X-100 surfactant on mixtures of water and Silver Flake A were dramatic. The sample containing 0.2 weight percent surfactant showed well dispersed silver in water resulting in a grayish liquid of consistent appearance. The sample containing no surfactant showed a large agglomeration of silver suspended in what appeared to be clear water.

Example 3

Experiments were performed using one of two amine curatives: 1) commercially available latent amine adduct curative known to cure at relatively high temperatures, i.e. >~85° C. (the reaction product of approximately equimolecular proportions of phthalic anhydride and diethylenetriamine, available from Huntsman), and 2) a curative synthesized from the reaction product of a mixture of triethylenetetraamine, dimethyldipropylenetriamine, and a mixture of dibasic esters (dimethyl succinate, gluterate, adipate). This curative was known to cure at relatively low temperatures, i.e. >~49° C.

Table 1 summarizes the ingredients (excluding the surfactant) used to make the aqueous formulation based on the commercial latent amine adduct. Note that epoxy resin used was a pre-emulsified material containing 40 weight percent solids, and the total water in the final solution was 20 weight percent. The formulation was mixed in DAC-400 Hauschild mixer. Triton X-100 surfactant at increments of ~0.3 g was added to the formulation and mixed in the Hauschild until a very uniform, free-flowing mixture having no clumps was achieved. The total amount of Triton X-100 used was approximately 1.3 weight percent based on total solids. Films were then cast from the waterborne formulation using bird bar applicators of varying wet thickness. The wet films were then placed in an oven and cured for 2 hours at 177° C. The resistivity of the cured films was measured using a Keithly 580 Micro-ohmmeter equipped with a 4-Point probe. Scanning electron microscopy analyses were conducted with a LEO1450VP SEM at an operating voltage of 10 kV using a secondary electron detector.

TABLE 1

Formulation summary of waterborne coating based on the commercial latent amine adduct.

| Component | Density | EEW or AHEW | Weight Percent | Volume Percent |
| --- | --- | --- | --- | --- |
| Epon 828 DGEBA | 1.19 | 187 | 28.2 | 60.6 |
| Triton X-100 | 1.07 | N/A | 0.369 | 0.9 |
| Commercial amine adduct | 1.08 | 65.8 | 9.9 | 23.5 |
| Silver Flake A | 10.5 | 0 | 61.6 | 15.0 |

Figure 2:
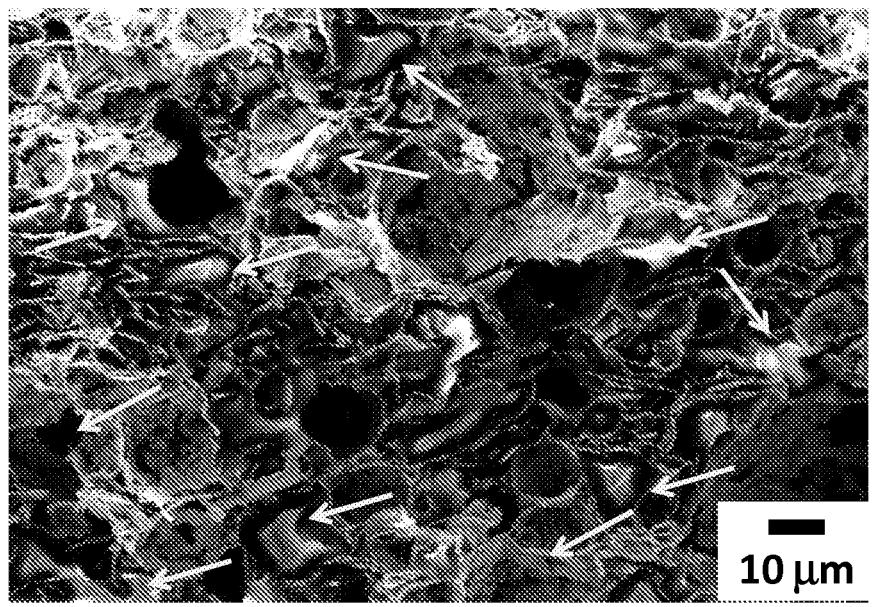
FIG. 2. Is a SEM photomicrograph of the cured formulation listed in Table 1, in an embodiment of the invention.

FIG. 1 shows plots of 4-Point probe resistance of the cured films versus film areal weight for the water-borne system. The films were cured at 177° C. for 2 hours. Included in this plot is data based on a formulation previously obtained using the same Silver Flake A, but with methyl ethyl ketone (MEK) as the solvent. Note the waterborne system is capable of delivering comparable electrical resistance as that of the solvent-borne system. FIG. 2 shows an SEM photomicrograph of a waterborne film of an embodiment of the present invention that possesses the characteristic heterogeneous morphology. The arrows point to phase-separated polymer domains.

Example 4

Further investigations on a broader range of surfactants led to the discovery that commercially available epoxy resins, Epiclon 830S (DIC Corporation) and an epoxy novolac resin, could be dispersed in water along with the silver; thereby eliminating the reliance on commercial colloidal epoxy dispersions. This allows specific tailoring of the surfactant to a particular system, and avoids the problems associated with mismatched surfactants such as films that are too brittle or poor conductivity.

TABLE 2

Formulation summary of waterborne coating based on the synthesized curative and emulsified blend of Epiclon 830S and a commercially available epoxy novolac resin

| Component | Weight Percent | Volume Percent |
| --- | --- | --- |
| Epiclon 803S | 19.01% | 44.75% |
| Epoxy novolac resin | 6.34% | 12.86% |
| Synthesized amine adduct | 9.20% | 22.31% |
| Silver Flake A | 62.92% | 14.10% |
| Surfactant Blend | 2.53% | 5.96% |

Figure 3:
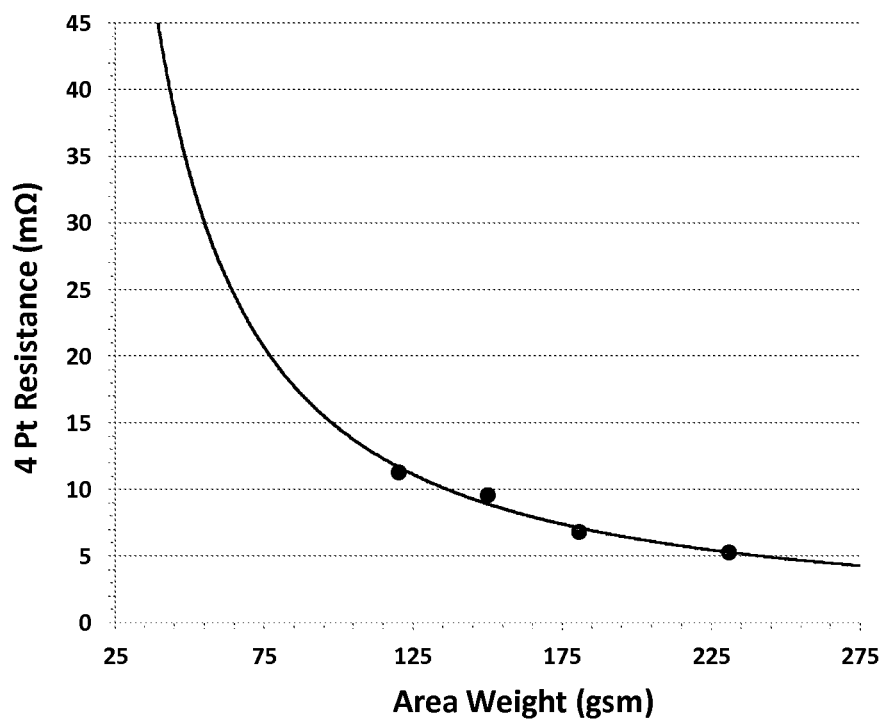
FIG. 3. Is a plot of the effect of film area weight on the resistance of cured films in an embodiment of the invention.
Figure 4:
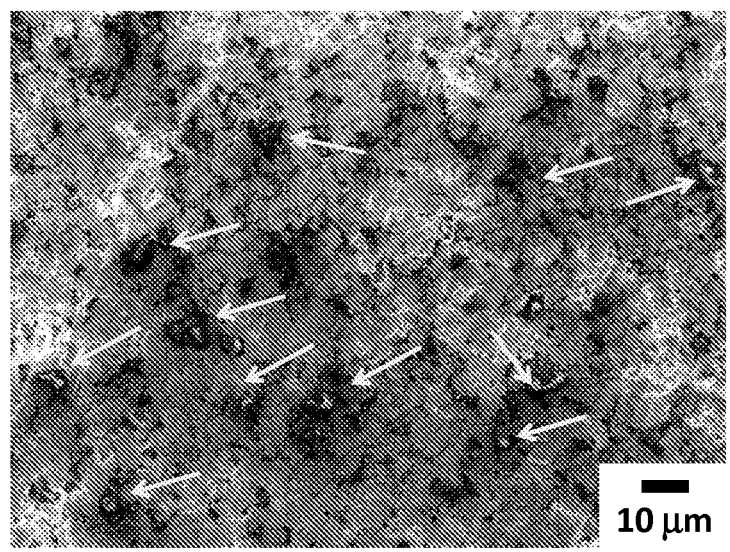
FIG. 4. Is a SEM photomicrograph of cured films in an embodiment of the invention.

A blend of surfactants, Synperonic PE/F 108 [Poly(ethylene glycol)-block-poly(propylene glycol)-block-poly(ethylene glycol), Poly(propylene glycol)-block-poly(ethylene glycol)-block-poly(propylene glycol)] with Maxemul 7101 (both from Croda International Plc), was used to disperse the epoxy blend (3 to 1 weight ratio of Epiclon 830S to epoxy novolac resin) at 40% solids in water. When formulated with silver (see Table 2), and cured at 177° C. with an aqueous solution of commercial latent amine adduct, the film exhibited approximately 2× the resistance (see FIG. 3) than the solvent-borne data shown in FIG. 1. FIG. 4 provides morphological evidence of the classic heterogeneous morphology as determined by SEM. The arrows point to phase-separated polymer domains.

Before preparing water-based formulations derived from the standard low temperature adduct, a number of other surfactants were screened for the ability to disperse silver flake. Brij-30 (available from Croda), chemically know as polyethylene glycol dodecyl ether or polyoxyethylene (4) lauryl ether, was shown to be effective at dispersing a stearic acid coated Silver Flake B (weight loss=0.5 g/100 g Ag at 538° C., particle size (D50)=~15.2 microns) and stearic acid coated Silver Flake A, and stearic acid coated Silver Powder 1 (weight loss=0.7 g/100 g Ag at 538° C., particle size (D50)=~1.2 microns), into water. The surfactant's structure is somewhat similar in to that of Triton X-100 but is not based on alkylphenol. The dispersion formed when mixing the surfactant to silver to water weight ratio of 0.6 to 40 to 60, respectively, by weight was very smooth.

TABLE 3

Epi-Rez 3510-H60 epoxy and Brij-30 surfactant

| Component | Weight (g) | Weight % |
| --- | --- | --- |
| Epi-Rez | 9.79 | 20.2 |
| Powder 1 | 4.98 | 10.3 |
| Silver Flake B | 22.67 | 46.7 |
| Brij-30 | 0.276 | 0.56 |
| Water | 8.21 | 16.9 |
| Curative | 2.57 | 5.3 |

Figure 5:
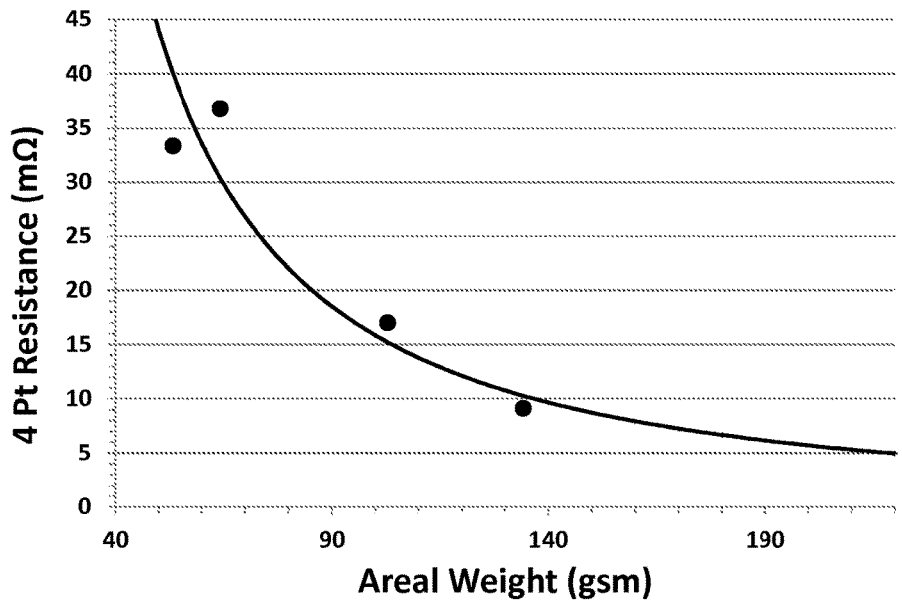
FIG. 5. Is a plot of the effect of film areal weight on the resistance of water-borne filmed based on the low temperature amine adduct in an embodiment of the present invention.

Table 3 summarizes the formulation prepared from the Brij-30 surfactant, low temperature adduct, and the Epi-Rez 3510-H60 epoxy (from Momentive) used in the latent amine adduct work. Note that a blend of spherical silver powder (Powder 1, see above for details) and silver flake (Silver Flake B, see above for details) was used in this formulation. Prior solvent-borne investigations showed that such blends performed better than the Silver Flake A alone when using the low temperature adduct. From this formulation, a series of films of different areal weights and correspondingly different thickness were cast and cured for 4 hours at 49° C. Resistance values on these films, as shown in FIG. 5, were promising with absolute values within 2× of the solvent-based formulation derived from latent amine adduct. The films were cured for 4 hours at 49° C.

Figure 6:
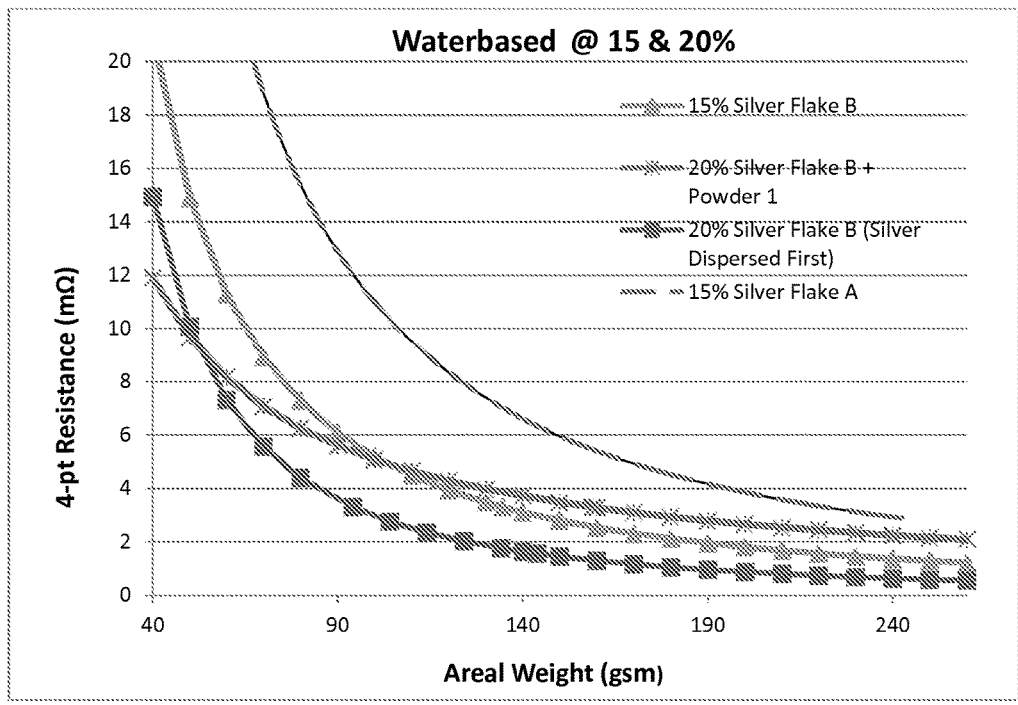
FIG. 6. Is a plot of the effect of film areal weight on the resistance of several different formulations of certain embodiments of the invention.

FIG. 6, which compares the original data (as shown in FIG. 1) at 15 volume percent Silver Flake A with 15 volume percent Silver Flake B water-based. Additionally, data based on 20 volume percent Silver Flake B and Silver Powder 1 made dispersing the epoxy first, and 20 volume percent Silver Flake B dispersing the silver into the water first is shown. It appears that using a larger silver flake, Silver Flake B vs. Silver Flake A, leads to more stable dispersions as they are more likely to be held in suspension leading to a higher conductivity (lower resistance) for a given weight percentage of silver. Additionally, dispersing the silver first appears to lead to a higher conductivity than dispersing the resin first.

What is claimed is:

1. An aqueous composition comprising a resin, a curative, a filler, a surfactant, and water; wherein the resin comprises an average molecular weight of less than about 800 Daltons and comprises at least 50 weight percent of a surfactant-modified epoxy or phenoxy resin, wherein the surfactant modified epoxy resin comprises at least one of a Bis-A or Bis-F type epoxy resin modified with an ethylene oxide/propylene oxide polyether monoamine.

2. The composition of claim 1, wherein the resin further comprises an unmodified epoxy resin.

3. The composition of claim 2, wherein the unmodified epoxy resin comprises a degree of polymerization of less than 1 repeat unit.

4. The composition of claim 2, wherein the resin comprises at least one of diglycidyl ether of bisphenol F, diglycidyl ether of bisphenol A, or epoxy novolac.

5. The composition of claim 2, wherein the resin comprises no reactive groups other than epoxide or hydroxyl.

6. The composition of claim 1, wherein the composition is free of isocyanates and acrylates.

7. The composition of claim 1, wherein the curative comprises a latent amine adduct.

8. The composition of claim 7, wherein the curative comprises a polyamine anhydride adduct based on the reaction between phthalic anhydride and triethylenetetraamine or the reaction between tetraethylendiamine, dimethyldipropylenetriamine, and a dibasic ester.

9. The composition of claim 1, wherein the curative is present in an amount comprising 15 to 40 weight percent based on the weight of the resin and the curative combined.

10. The composition of claim 1, wherein the surfactant is present relative to the filler in a weight ratio of 1.0:20 to 1.0:100.

11. The composition of claim 1, wherein the filler comprises at least one of a silver flake and a silver powder.

12. The composition of claim 1, wherein the filler comprises a non-polar coating on a surface thereof.

13. The composition of claim 12, wherein the coating comprises stearic acid.

14. The composition of claim 1, wherein the conductivity of the dried, cured composition is at least 10 s/cm for a filler content of 2 percent based on the total volume of the composition.

15. A method for coating a substrate comprising:
    a) Mixing together the aqueous composition of claim 1 to provide a homogenously mixed coating composition;
    b) applying the coating composition to a substrate;
    c) drying the composition; and
    d) curing the coating composition.

16. The method of claim 15, wherein during step a) the filler is first dispersed in the water with surfactant, then the resin is dispersed into the filler containing water.

17. The method of claim 15, wherein during step c) the composition remains homogenously mixed, and during step d) the composition becomes heterogeneously mixed as the filler and resin self-assemble to form connected pathways of filler through the resin.

* * * * *